(12) United States Patent
Seo et al.

(10) Patent No.: US 11,372,257 B2
(45) Date of Patent: Jun. 28, 2022

(54) SEE-THROUGH DISPLAY DEVICE

(71) Applicant: SAMSUNG ELECTRONICS CO., LTD., Suwon-si (KR)

(72) Inventors: Wontaek Seo, Yongin-si (KR); Changkun Lee, Seoul (KR); Juwon Seo, Osan (KR); Geeyoung Sung, Daegu (KR); Bongsu Shin, Seoul (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 437 days.

(21) Appl. No.: 16/237,336

(22) Filed: Dec. 31, 2018

(65) Prior Publication Data

US 2020/0050008 A1 Feb. 13, 2020

(30) Foreign Application Priority Data

Aug. 8, 2018 (KR) .................. 10-2018-0092670

(51) Int. Cl.
  *G02B 27/14* (2006.01)
  *G02B 27/09* (2006.01)
  (Continued)

(52) U.S. Cl.
  CPC ....... *G02B 27/144* (2013.01); *G02B 27/0983* (2013.01); *G02B 30/25* (2020.01);
  (Continued)

(58) Field of Classification Search
  CPC .............. G02B 27/01; G02B 27/0101; G02B 27/0149; G02B 27/017; G02B 27/0172; G02B 27/0176; G02B 27/0179; G02B 27/14; G02B 27/141; G02B 27/142; G02B 27/143; G02B 27/144; G02B 27/145; G02B 27/146; G02B 27/147; G02B 27/148; G02B 27/149; G02B 30/26; G02B 30/28; G02B 30/29; G02B 30/30; G02B 30/31; G02B 30/32; G02B 30/33; G02B 30/27; G02B 2027/0174; G02B 1/11; G02B 1/111; G02B 1/113; G02B 1/115; G02B 1/116;
  (Continued)

(56) References Cited

U.S. PATENT DOCUMENTS

| 8,472,119 | B1 | 6/2013 | Kelly |
| 8,488,246 | B2 * | 7/2013 | Border .................. G06Q 30/02 359/13 |
| 8,537,075 | B2 | 9/2013 | Crocco et al. |
| 8,743,464 | B1 | 6/2014 | Amirparviz |
| 9,019,175 | B2 | 4/2015 | Lu |

(Continued)

FOREIGN PATENT DOCUMENTS

KR 2001-0086594 A 9/2001

*Primary Examiner* — Marin Pichler
*Assistant Examiner* — Alberto J Betancourt
(74) *Attorney, Agent, or Firm* — Sughrue Mion, PLLC

(57) ABSTRACT

A see-through display device includes an optical coupler that couples first light input from a first direction and second light input from a second direction that is different from the first direction, the optical coupler transferring coupled light including the first light and the second light to an observer, and a shading member disposed in front of the optical coupler, the shading member transferring the second light to the optical coupler by reducing a light amount of the second light. The see-through display device limits a reflection phenomenon occurring between the optical coupler and the shading member.

25 Claims, 14 Drawing Sheets

(51) Int. Cl.
    *G02B 30/25* (2020.01)
    *G02B 30/26* (2020.01)
    *G02B 30/35* (2020.01)
    *G02B 27/01* (2006.01)

(52) U.S. Cl.
    CPC ............. *G02B 30/26* (2020.01); *G02B 30/35* (2020.01); *G02B 27/0172* (2013.01)

(58) Field of Classification Search
    CPC ................ G02B 27/283; G02B 27/285; G02B 2027/012; G02B 2027/0121; G02B 5/003; G02B 5/005; G02B 5/006; H04N 5/7491
    USPC ...... 359/13–14, 629–633; 345/7–9; 348/115; 349/11
    See application file for complete search history.

(56) References Cited

U.S. PATENT DOCUMENTS

| | | |
|---|---|---|
| 9,182,596 B2 | 11/2015 | Border et al. |
| 2012/0242697 A1* | 9/2012 | Border ................. G02B 27/017 345/633 |
| 2015/0177519 A1* | 6/2015 | Cakmakci ........... G02B 27/0172 359/631 |
| 2015/0219899 A1 | 8/2015 | Mack et al. |
| 2017/0108696 A1 | 4/2017 | Harrison et al. |
| 2018/0120567 A1 | 5/2018 | Cobb |
| 2019/0041642 A1* | 2/2019 | Haddick ................. G06F 1/163 |
| 2019/0147652 A1* | 5/2019 | Chien ................... G06T 19/006 345/633 |
| 2020/0049992 A1* | 2/2020 | Peng .................... G02B 5/3025 |
| 2021/0311314 A1* | 10/2021 | Liu ................... G02B 27/0172 |

* cited by examiner

SEE-THROUGH DISPLAY DEVICE

CROSS-REFERENCE TO RELATED APPLICATION

This application is based on and claims priority under 35 U.S.C. § 119 to Korean Patent Application No. 10-2018-0092670, filed on Aug. 8, 2018, in the Korean Intellectual Property Office, the disclosure of which is incorporated herein in its entirety by reference.

BACKGROUND

1. Field

The present disclosure relates to a see-through type display device.

2. Description of Related Art

Three-dimensional image display technologies have been applied to a variety of fields, for example, to image devices related to virtual reality (VR) displays, or augmented reality (AR) displays.

Head mount displays providing VR are currently in a commercialization phase and widely applied to the entertainment industries. In addition, the head mount displays have been developed to be applied to the medical, educational, and industrial fields.

AR displays, which are a developed form of VR displays, are image devices capable of combining the real world with VR, which may characteristically induce interaction between reality and VR. The interaction between reality and VR is based on a function of providing information in real time with respect to a real situation, and shows virtual objects or information overlapped with an environment of the real world, thereby further enhancing the experience of reality.

In the above device, various types of optical elements are arranged on an optical path along which two types of images reach the eyes. Reflection may be generated at a boundary between the optical elements, and thus unwanted optical artifacts are generated, thereby deteriorating image quality.

SUMMARY

Provided are see-through type display devices having improved image quality.

Additional aspects will be set forth in part in the description which follows and, in part, will be apparent from the description, or may be learned by practice of the presented embodiments.

According to an aspect of the disclosure, a see-through type display device includes an optical coupler coupling first light input in a first direction and second light input in a second direction that is different from the first direction and transferring coupled light to an observer, a shading member disposed in front of the optical coupler and transferring the second light to the optical coupler by reducing a light amount of the second light, and an optical element reducing a reflection phenomenon occurring between the optical coupler and the shading member.

The see-through type display device may further include an image forming optical system forming an image to allow the first light to include image information.

The optical coupler may include a semitransparent concave mirror.

The optical coupler may further include a beam splitter reflecting the first light to proceed toward the semitransparent concave mirror and transmitting light input from the semitransparent concave mirror.

The beam splitter may include a half mirror arranged inclined to an optical axis of the first light.

An antireflection layer may be formed on at least one of two surfaces facing each other of the shading member and the semitransparent concave mirror.

The semitransparent concave mirror and the shading member may be combined with each other.

Two surfaces facing each other of the semitransparent concave mirror and the shading member may have a same curved surface shape.

A difference in radii of curvature of center portions of two surfaces facing each other of the semitransparent concave mirror and the shading member may be set to satisfy a following condition: $d1/W1 < 1/10$, where "d1" denotes a distance between edges of the semitransparent concave mirror and the shading member, and "W1" is a width of the semitransparent concave mirror in a direction perpendicular to an optical axis of the semitransparent concave mirror.

A radius of curvature and an arrangement position of each of the semitransparent concave mirror and the shading member may be determined to correspond to a part of each of two concentric spheres having different radii and centers at an eye of the observer.

The optical coupler may further include a polarization beam splitter reflecting light of a first polarization of the first light to proceed toward the semitransparent concave mirror and transmitting light of a second polarization input from the semitransparent concave mirror, and a first quarter wave plate arranged between the polarization beam splitter and the semitransparent concave mirror.

An additional functional optical film preventing light leakage of the first light may be further arranged between the optical coupler and the shading member.

The additional functional optical film may include a second quarter wave plate and a linear polarizer.

An antireflection layer may be formed on at least two of two outermost surfaces of the additional functional optical film, a surface of the shading member facing the additional functional optical film, and a surface of the semitransparent concave mirror facing the additional functional optical film.

The shading member, the additional functional optical film, and the semitransparent concave mirror may be combined with one another.

The additional functional optical film and the semitransparent concave mirror may be combined with each other.

Two surfaces facing each other of the additional functional optical film and the semitransparent concave mirror may have a same curved surface shape.

A difference in radii of curvature of center portions of two surfaces facing each other of the additional functional optical film and the semitransparent concave mirror may be set to satisfy a following condition: $d2/W1 < 1/10$, where "d2" denotes a distance between edges of the additional functional optical film and the semitransparent concave mirror, and "W1" is a width of the semitransparent concave mirror in a direction perpendicular to an optical axis of the semitransparent concave mirror.

The shading member and the additional functional optical film may be combined with each other.

Two surfaces facing each other of the shading member and the additional functional optical film may have a same curved surface shape.

A difference in radii of curvature of center portions of two surfaces facing each other of the shading member and the additional functional optical film may be set to satisfy a following condition: $d3/W2<1/10$, where "d3" denotes a distance between edges of the shading member and the additional functional optical film, and "W2" is a width of the additional functional optical film in a direction perpendicular to an optical axis of the additional functional optical film.

A radius of curvature and an arrangement position of each of the shading member, the additional functional optical film, and the semitransparent concave mirror may be determined to correspond to a part of each of three concentric spheres having different radii and centers at an eye of the observer.

The see-through type display device may be a wearable device.

According to another aspect of the disclosure, a see-through display device includes an optical coupler that couples first light input from a first direction and second light input from a second direction that is different from the first direction, the optical coupler transferring coupled light including the first light and the second light to an observer; and a shading member disposed in front of the optical coupler, the shading member transferring the second light to the optical coupler by reducing a light amount of the second light, wherein the see-through display device is configured to limit a reflection phenomenon occurring between the optical coupler and the shading member.

The see-through display device may further include an image forming optical system that forms an image, wherein the first light includes the image.

The optical coupler may include a semitransparent concave mirror.

The see-through display device may further include an optical element configured to limit the reflection phenomenon occurring between the optical coupler and the shading member.

The optical coupler may further include a beam splitter that reflects the first light toward the semitransparent concave mirror and transmits light input from the semitransparent concave mirror.

The beam splitter may include a half mirror arranged inclined to an optical axis of the first light.

The optical element may include an antireflection layer formed on at least one of a surface of the shading member and a surface of the semitransparent concave mirror that faces the surface of the shading member.

A surface of the semitransparent concave mirror may contact a surface of the shading member.

A surface of the semitransparent concave mirror may have a same curved surface shape as a surface of the shading member that faces the surface of the semitransparent concave mirror.

A difference in radii of curvature of a center portion of a surface of the semitransparent concave mirror and a center portion of a surface of the shading member that faces the surface of the semitransparent concave mirror may be set to satisfy a following condition:

$$d1/W1<1/10$$

where "d1" is a distance in a direction parallel to an optical axis of the semitransparent concave mirror between an edge of the semitransparent concave mirror and a corresponding edge of the shading member, and "W1" is a width of the semitransparent concave mirror in a direction perpendicular to the optical axis of the semitransparent concave mirror.

The semitransparent concave mirror may be formed in a shape of a first spherical sector of a first sphere centered at an eye of the observer, and the shading member may be formed in a shape of a second spherical sector of a second sphere centered at the eye of the observer, the second sphere having a second radius different from a first radius of the first sphere.

The optical coupler may further include a polarization beam splitter that reflects a portion of the first light having a first polarization toward the semitransparent concave mirror and transmits light having a second polarization input from the semitransparent concave mirror; and a first quarter wave plate arranged between the polarization beam splitter and the semitransparent concave mirror.

An additional functional optical film that prevents light leakage of the first light may be further arranged between the optical coupler and the shading member.

The additional functional optical film may include a second quarter wave plate and a linear polarizer.

An antireflection layer may be formed on at least two surfaces from among a first surface of the additional functional optical film, a second surface of the additional functional optical film, a surface of the shading member facing the additional functional optical film, and a surface of the semitransparent concave mirror facing the additional functional optical film.

A surface of the shading member may contact a first surface of the additional functional optical film, and a surface of the semitransparent concave mirror may contact a second surface of the additional functional optical film.

A surface of the additional functional optical film may contact a surface of the semitransparent concave mirror.

A surface of the additional functional optical film may have a same curved surface shape as a surface of the semitransparent concave mirror.

A difference in radii of curvature of a center portion of a surface of the additional functional optical film and a center portion of a surface of the semitransparent concave mirror that faces the surface of the additional functional optical film may be set to satisfy a following condition:

$$d2/W1<1/10$$

where "d2" is a distance in a direction parallel to an optical axis of the semitransparent concave mirror between an edge of the additional functional optical film and a corresponding edge of the semitransparent concave mirror, and "W1" is a width of the semitransparent concave mirror in a direction perpendicular to the optical axis of the semitransparent concave mirror.

A surface of the shading member may contact a surface of the additional functional optical film.

A surface of the shading member may have a same curved surface shape as a surface of the additional functional optical film.

A difference in radii of curvature of a center portion of a surface of the shading member and a center portion of a surface of the additional functional optical film that faces the surface of the shading member may be set to satisfy a following condition:

$$d3/W2<1/10$$

where "d3" is a distance in a direction parallel to an optical axis of the additional function optical film between an edge of the shading member and a corresponding edge of the additional functional optical film, and "W2" is a width of the additional functional optical film in a direction perpendicular to the optical axis of the additional functional optical film.

The shading member may be formed in a shape of a first spherical sector of a first sphere centered at an eye of the observer, the additional functional optical film may be formed in a shape of a second spherical sector of a second sphere centered at the eye of the observer, the second sphere having a second radius different from a first radius of the first sphere, and the semitransparent concave mirror may be formed in a shape of a third spherical sector of a third sphere centered at the eye of the observer, the third sphere having a third radius different from the first radius and different from the second radius.

A wearable device may include the see-through display device of claim 1.

According to another aspect of the disclosure, a display device includes an optical coupler that receives first light corresponding to a first image and traveling on a first optical path and second light corresponding to a second image and traveling on a second optical path different from the first optical path, and that transmits the received first light and second light on a third optical path; and a shading member provided on the first optical path that receives the first light and transmits a reduced amount of the first light to the optical coupler, wherein the display device is configured to limit reflection of the reduced amount of the first light between the shading member and the optical coupler.

An antireflection layer may be formed on at least one from among a surface of the optical coupler upon which the first light is incident and a surface of the shading member that transmits the reduced amount of the first light to the surface of the optical coupler.

A surface of the optical coupler that receives the reduced amount of the first light may contact a surface of the shading member that transmits the reduced amount of the first light.

The optical coupler may be formed in a shape of a first spherical sector of a first sphere having a center at an eye of an observer, and the shading member may be formed in a shape of a second spherical sector of a second sphere having a center at the eye of the observer, a first radius of the first sphere being different from a second radius of the second sphere.

The optical coupler may include a semitransparent concave mirror, the first light may be incident upon a first surface of the semitransparent concave mirror and is transmitted by the semitransparent concave mirror, and the second light may be incident upon a second surface of the semitransparent mirror and is reflected by the semitransparent mirror.

The display device may further include an optical film provided on the first optical path between the shading member and the semitransparent concave mirror, a portion of the second light may pass through the semitransparent concave mirror, and the optical film may block the portion of the second light that passes through the semitransparent concave mirror and transmits the first light traveling on the first optical path.

Antireflection layers may be formed on at least two from among a first surface of the optical film, a second surface of the optical film, a surface of the semitransparent concave mirror that receives the reduced amount of the first light from the optical film, and a surface of the shading member that transmits the reduced amount of the first light to the optical film.

A surface of the shading member that transmits the reduced amount of the first light may contact a first surface of the optical film that receives the reduced amount of the first light and a surface of the semitransparent concave mirror that receives the reduced amount of the first light may contact a second surface of the optical film that transmits the reduced amount of the first light.

A surface of the semitransparent concave mirror that receives the reduced amount of the first light may contact a surface of the optical film that transmits the reduced amount of the first light.

A surface of the shading member that transmits the reduced amount of the first light may contact a surface of the optical film that receives the reduced amount of the first light.

The semitransparent concave mirror may be formed in a shape of a first spherical sector of a first sphere having a center at an eye of an observer, the shading member may be formed in a shape of a second spherical sector of a second sphere having a center at the eye of the observer, a first radius of the first sphere being different from a second radius of the second sphere, and the optical film may be formed in a shape of a third spherical sector of a third sphere having a center at the eye of the observer, a third radius of the third sphere being different from the first radius and the second radius.

BRIEF DESCRIPTION OF THE DRAWINGS

These and/or other aspects, features, and advantages will be more apparent and more readily appreciated from the following description taken in conjunction with the accompanying drawings in which.

DETAILED DESCRIPTION

Figure 1:
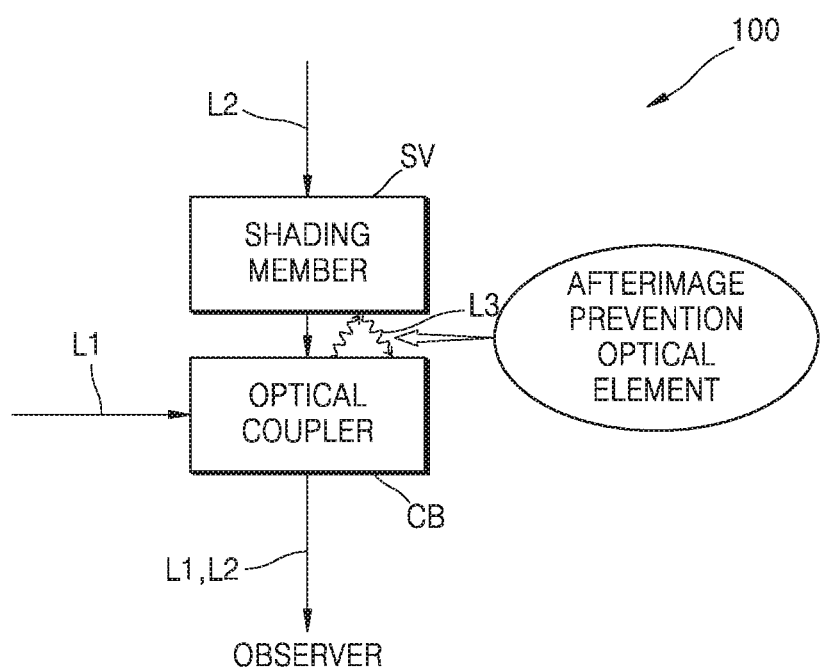
FIG. 1 is a conceptual diagram showing a schematic configuration of a see-through type display device according to an embodiment.

Reference will now be made in detail to embodiments, examples of which are illustrated in the accompanying drawings, wherein like reference numerals refer to like elements throughout. Also, the size of each layer illustrated in the drawings may be exaggerated for convenience of explanation and clarity. In this regard, the present embodiments may have different forms and should not be construed as being limited to the descriptions set forth herein. Accordingly, the embodiments are merely described below, by referring to the figures, to explain aspects of the present description.

In a layer structure, when a constituent element is disposed "above" or "on" another constituent element, the constituent element may be directly on the other constituent element or above the other constituent element in a non-contact manner.

As used herein, the singular forms "a," "an" and "the" and similar referents are intended to include the plural forms as well, unless the context clearly indicates otherwise. It will be further understood that the terms "comprises" and/or "comprising" used herein specify the presence of stated features or components, but do not preclude the presence or addition of one or more other features or components.

Also, the steps of all methods described herein can be performed in any suitable order unless otherwise indicated herein or otherwise clearly contradicted by context. The present disclosure is not limited to the described order of the steps. The use of any and all examples, or language (e.g., "such as") provided herein, is intended merely to better illuminate the disclosure and does not pose a limitation on the scope of the disclosure unless otherwise claimed.

FIG. 1 is a conceptual diagram showing a schematic configuration of a see-through type display device 100 according to an embodiment.

The see-through type display device 100 according to the present embodiment may include an optical coupler CB coupling first light L1 input in a first direction and second light L2 input in a second direction and transferring coupled light to an observer, and a shading member SV disposed in front of the optical coupler CB and transferring the second light L2 to the optical coupler CB by reducing the light amount of the second light L2.

The optical coupler CB may include a semitransparent member, and further include a path changing member for changing an optical path to allow lights input in different directions to proceed in the same direction, and a focusing member for focusing an image.

The shading member SV may be formed of, for example, a transparent plastic material or a glass material, which is colored in black to reduce the light amount of the second light L2.

The first light L1 and the second light L2 may be light containing different image information. For example, the first light L1 may be image light formed by a display device, and the second light L2 may be received from an external real environment. When the two types of lights are combined with each other and transferred to the observer and reflection light L3 generated between the shading member SV and the optical coupler CB reaches the observer together, an unwanted afterimage may be recognized by the observer. The term "afterimage" may signify all phenomena such as a ghost image, a double image, flare, or an optical artifact, which deteriorate image quality as unintended light is recognized by the observer.

The see-through type display device 100 according to the present embodiment may include an optical element which reduces (i.e., limits) a reflection phenomenon occurring between the optical coupler CB and the shading member SV. Accordingly, since the reason for deterioration of image quality may be reduced, a quality image may be recognized by the observer.

Figure 2:
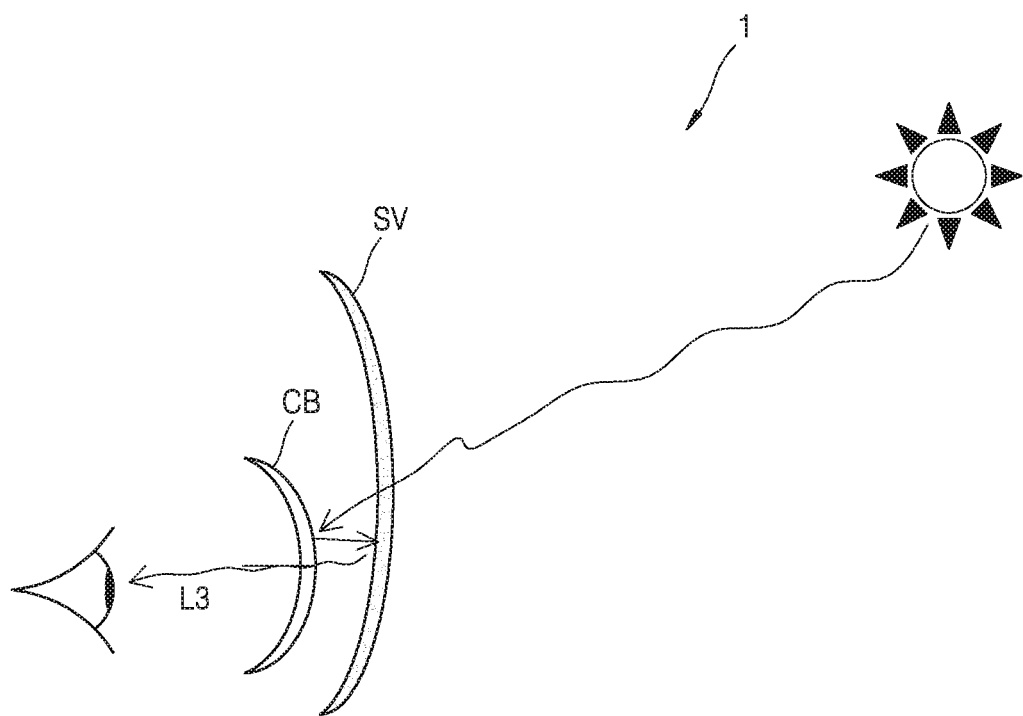
FIG. 2 is a conceptual diagram showing an optical path on which an afterimage is formed by ambient light in a see-through type display device according to a comparative example.

FIG. 2 is a conceptual diagram showing an optical path on which an afterimage is formed by ambient light in a see-through type display device 1 according to a comparative example.

The optical coupler CB and the shading member SV of the see-through type display device 1 may have a curved surface shape as illustrated in FIG. 2. Since the optical coupler CB and the shading member SV include a material that reflects part of incident light and transmits the other part of the incident light, part of light transmitted through the shading member SV is reflected by a surface of the optical coupler CB and reflected again by a surface of the shading member SV and then passes through the optical coupler CB as shown, e.g., in FIG. 2. As such, when double reflected light L3 is recognized by the observer, source light is reimaged, and thus image quality may deteriorate.

Although FIG. 2 illustrates an optical path on which an external light source is reimaged, similar deterioration of image quality due to double reflection may occur with light input from a different direction, for example, image light formed by a display device that is transferred to the observer through the optical coupler CB.

Figure 3:
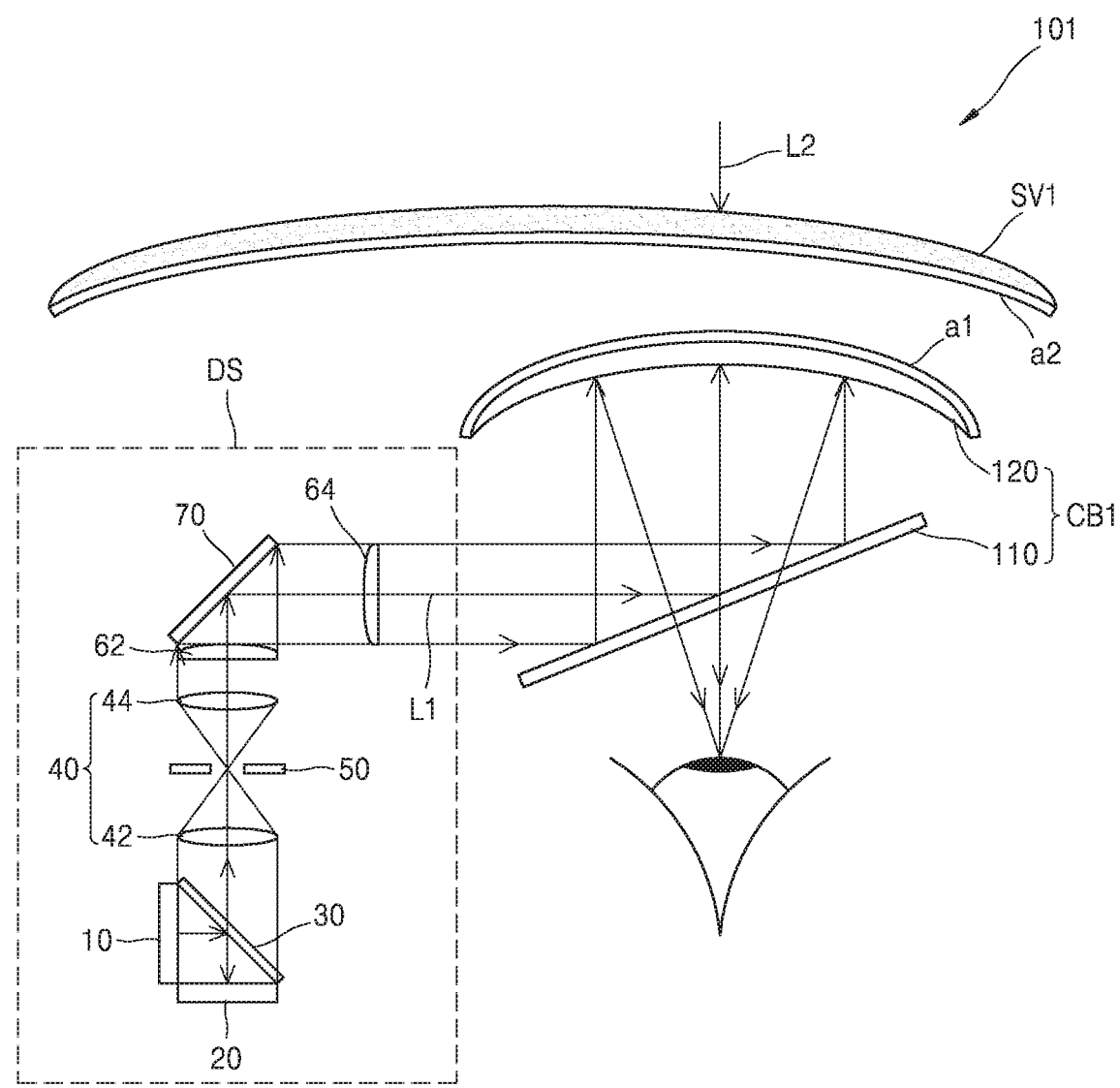
FIG. 3 illustrates a schematic optical arrangement of a see-through type display device according to an embodiment.

FIG. 3 illustrates a schematic optical arrangement of a see-through type display device 101 according to an embodiment.

The see-through type display device 101 according to the present embodiment may include an optical coupler CB1 coupling the first light L1 input in the first direction and the second light L2 input in the second direction and transferring combined light to the observer, and a shading member SV1 disposed in front of the optical coupler CB1 and transferring the second light L2 to the optical coupler CB1 by reducing the light amount of the second light L2.

The optical coupler CB1 may include a semitransparent concave mirror 120 and a beam splitter 110. The beam splitter 110 reflects the first light L1 to proceed toward the semitransparent concave mirror 120, and transmits light input from the semitransparent concave mirror 120 to the observer. The beam splitter 110 may be a half mirror disposed to be inclined with respect to an optical axis of the incident first light L1. A configuration of the beam splitter 110 may be omitted. For example, an image forming optical system DS may be disposed such that the first light L1 formed by the image forming optical system DS may be directly incident on the semitransparent concave mirror 120.

An antireflection layer may be formed on at least one of two facing surfaces of the shading member SV1 and the semitransparent concave mirror 120, i.e., the surface of the shading member SV1 that faces the semitransparent concave mirror 120 and the surface of the semitransparent concave mirror 120 that faces the shading member SV1. The antireflection layer may be formed by alternately depositing two types of materials having different refractive indexes to a certain thickness, and have a configuration which causes destructive interference of reflected light formed at a plurality of boundary surfaces.

As shown in the drawing, an antireflection layer a1 may be formed on one of two surfaces of the semitransparent concave mirror 120, which faces the shading member SV1, and an antireflection layer a2 may be formed on one of two surfaces of the shading member SV1, which faces the semitransparent concave mirror 120. An antireflection layer may be formed on only one of the two surfaces described above or on only one of the two surfaces described above.

The see-through type display device 101 may also include the image forming optical system DS for forming an image to allow the first light L1 to include image information. An exemplary configuration of the image forming optical system DS is described below. The configuration of the image forming optical system DS described below is exemplary, but the present disclosure is not limited thereto.

The image forming optical system DS may include a light source 10, a display device 20 for forming an image by modulating light from the light source 10 according to image information, and an optical system for transferring the image to a certain position by magnifying or reducing the image.

The image formed by the display device 20 may be, for example, a stereo image provided to each of the left and right eyes of the observer. In the drawing, for convenience of illustration, only an optical system for a single eye is illustrated. The image formed by the display device 20 is not limited thereto, and may include a hologram image, a light field image, or an integral photography (IP) image. Furthermore, the image may include a multi-view image or a super multi-view image.

The display device 20 may include, for example, a liquid crystal on silicon (LCoS) device, a liquid crystal display (LCD) device, an organic light-emitting diode (OLED) display device, or a digital micromirror device (DMD). Furthermore, the display device 20 may include a next generation display device such as micro LED or quantum dot (QD) LED.

A beam splitter 30 may be provided between the light source 10 and the display device 20. The beam splitter 30 may reflect the light from the light source 10 to proceed toward the display device 20 to change an optical path of the light, and transmit the light modulated by the display device 20 as shown, e.g., in FIG. 3.

The light transmitted through the beam splitter 30 may be transferred to a relay optical system. The relay optical system may include a pair of relay lenses 40 and a spatial filter 50.

The relay lenses 40 may include two lenses 42 and 44, and the focal lengths of the two lenses 42 and 44 may be the same or different from each other. The image formed by the display device 20 may be magnified or reduced according to a ratio of the two focal lengths of the two lenses 42 and 44.

The spatial filter 50 may be located on or around a focal plane of the two lenses 42 and 44 forming the relay lenses 40. The spatial filter 50 may have an aperture such as a pinhole. The spatial filter 50 may remove noise from the light transmitted through the lens 42.

The light transmitted through the relay optical system may be magnified in two directions perpendicular to each other, passing through a first cylinder lens 62 and a second cylinder lens 64. Although a mirror member 70 is illustrated as being arranged between the first cylinder lens 62 and the second cylinder lens 64, the present disclosure is not limited thereto and the positions of the mirror member 70 and the first cylinder lens 62 may be switched with each other.

The first light L1 having a changed path at the beam splitter 110 reaches the semitransparent concave mirror 120, and then is reflected by the semitransparent concave mirror 120 and focused at a position of the observer. In this state, even when part of the first light L1 passes through the semitransparent concave mirror 120 instead of being reflected by it toward the observer, reflection of the first light L1 by the shading member SV1 is reduced by the antireflection layer a2 formed on one surface of the shading member SV1. Thus, the amount of light that is incident on an eye of the observer that has arrived via a multipath between the semitransparent concave mirror 120 and the shading member SV1 is reduced.

The second light L2 sequentially passes through the shading member SV1, the semitransparent concave mirror 120, and the beam splitter 110 and proceeds toward the eye of the observer. An optical path along which light is reflected by the semitransparent concave mirror 120 is not formed well due to the antireflection layer a1 formed on one surface of the semitransparent concave mirror 120. Furthermore, even when part of the second light L2 is reflected by the semitransparent concave mirror 120 instead of being transmitted by it, most of the reflected light is extinguished by the antireflection layer a2 formed on one surface of the shading member SV1. Thus, the amount of light that is incident to the eye of the observer that has arrived via a multipath between the semitransparent concave mirror 120 and the shading member SV1 is reduced.

Accordingly, in the see-through type display device 101, when an image formed by coupling the first light L1 and the second light L2 is provided to the observer, deterioration of image quality may be reduced.

Figure 4:
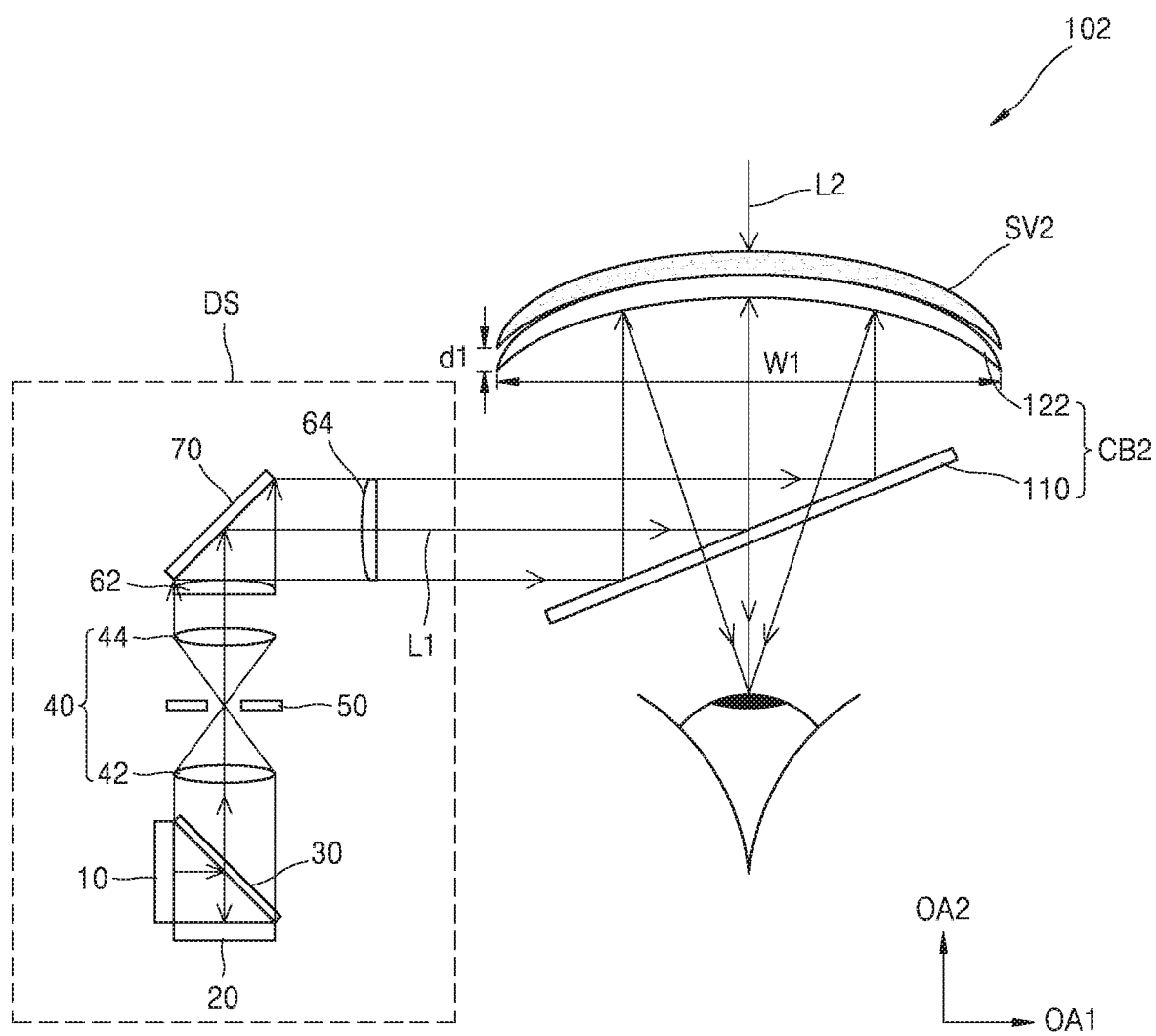
FIG. 4 illustrates a schematic optical arrangement of a see-through type display device according to an embodiment.

FIG. 4 illustrates a schematic optical arrangement of a see-through type display device 102 according to another embodiment.

The see-through type display device 102 may include an optical coupler CB2 for coupling the first light L1 input in the first direction and the second light L2 input in the second direction and transferring coupled light to the observer, and a shading member SV2 disposed in front of the optical coupler CB2 and transferring the second light L2 to the optical coupler CB2 by reducing the light amount of the second light L2. The see-through type display device 102 may also include the image forming optical system DS for forming an image to allow the first light L1 to include image information. The optical coupler CB2 may include the beam splitter 110 and a semitransparent concave mirror 122.

In the present embodiment, the semitransparent concave mirror 122 and the shading member SV2 may be combined with each other such that a surface of the semitransparent concave mirror 122 contacts a surface of the shading member SV2. In the configuration, reflection at a combined surface of the semitransparent concave mirror 122 and the shading member SV2 may be reduced. The semitransparent concave mirror 122 and the shading member SV2 may be formed of materials having the same refractive index. In this case, there is substantially no optical boundary at the combined surface of the semitransparent concave mirror 122 and the shading member SV2, and thus reflection at the combined surface may be reduced.

The two surfaces facing each other of the semitransparent concave mirror 122 and the shading member SV2 may have the same curved surface shape. The curved surface may be a spherical surface or an aspherical surface.

Although in the drawing the semitransparent concave mirror 122 and the shading member SV2 are illustrated as being cemented with each other, the illustration is exemplary. The surface of the semitransparent concave mirror 122 that faces the shading member SV2 and the surface of the shading member SV2 that faces the semitransparent concave mirror 122 may have radii of curvature that are similar enough to each other so as to reduce double reflection between the surfaces. The above condition may be satisfied by making a difference ΔR between the radii of curvature of the two surfaces less than or equal to a certain value. When the radii of curvature of the respective surfaces of the semitransparent concave mirror 122 and the shading member SV2 do not completely match with each other, a distance d1 may be formed between the edges of the semitransparent concave mirror 122 and the shading member SV2, and thus the difference ΔR in the radius of curvature may be expressed in terms of the distance d1. In other words, the difference ΔR in the radius of curvature may be expressed by a ratio of the distance d1 between the edges of the semitransparent concave mirror 122 and the shading member SV2 to a width W1 of the semitransparent concave mirror 122. The distance d1 and width W1 are shown, e.g., in FIG. 4. For example, a ratio of the distance d1 between the edges of the semitransparent concave mirror 122 and the shading member SV1 to the width W1 of the semitransparent concave mirror 122 in a direction perpendicular to an optical axis OA2 of the semitransparent concave mirror 122 may be set to a range in which the deterioration of image quality due to the double reflection is not recognizable to the human eye.

The difference ΔR in the radius of curvature at center portions of the two surfaces facing each other of the semitransparent concave mirror 122 and the shading member SV2 may be set to satisfy the following condition.

$$d1/W1 < 1/10$$

In the above inequality, "d1" denotes a distance between the edges of the semitransparent concave mirror 122 and the shading member SV2 and "W1" denotes a width of the semitransparent concave mirror 122 in a direction perpendicular to the optical axis OA2 of the semitransparent concave mirror 122.

Figure 5:
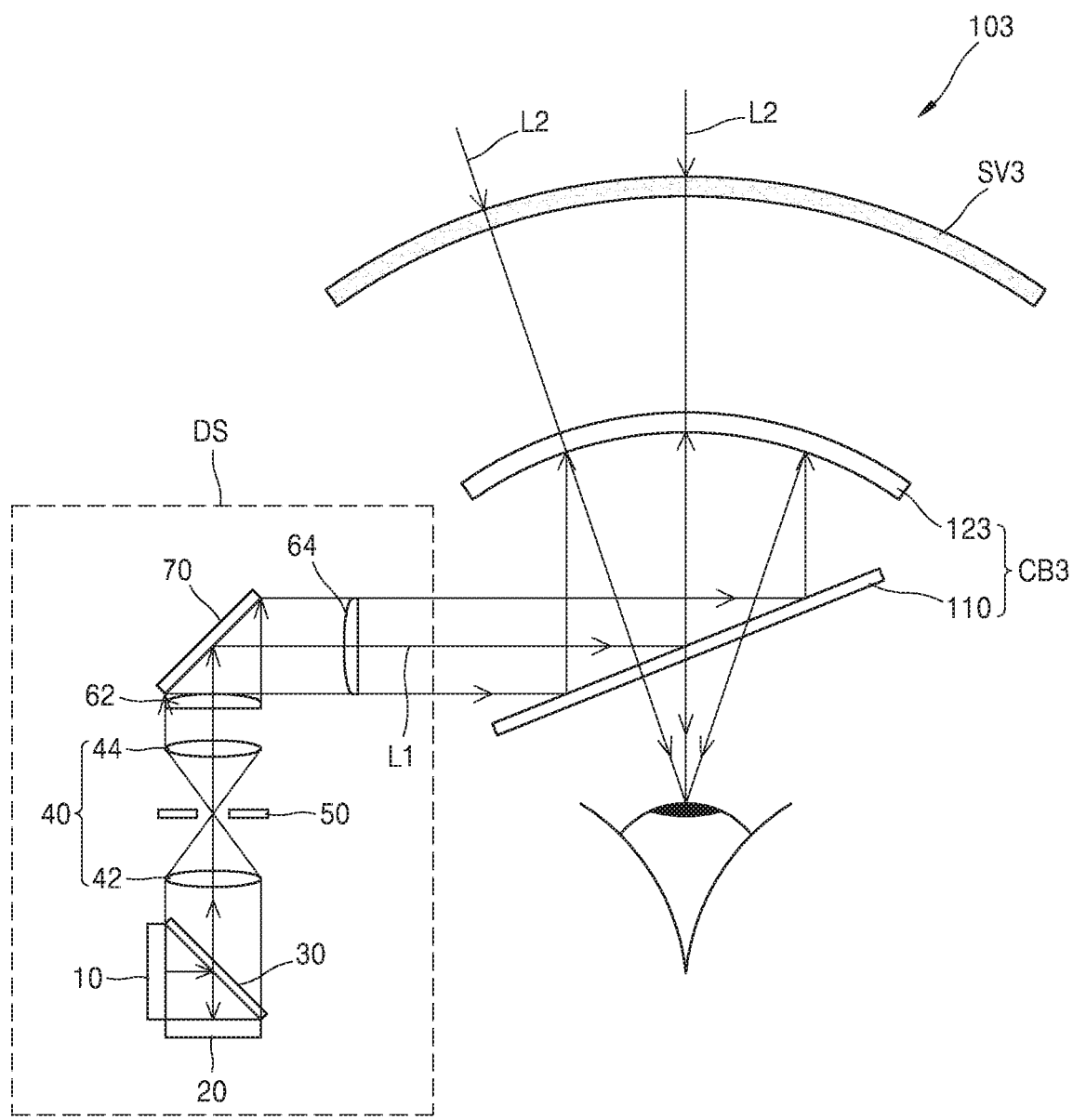
FIG. 5 illustrates a schematic optical arrangement of a see-through type display device according to an embodiment.

FIG. 5 illustrates a schematic optical arrangement of a see-through type display device 103 according to another embodiment.

The see-through type display device 103 may include an optical coupler CB3 for coupling the first light L1 input in the first direction and the second light L2 input in the second direction and transferring coupled light to the observer, and a shading member SV3 disposed in front of the optical coupler CB3 and transferring the second light L2 to the optical coupler CB3 by reducing the light amount of the second light L2. The see-through type display device 103 may also include the image forming optical system DS for forming an image to allow the first light L1 to include image information. The optical coupler CB3 may include the beam splitter 110 and a semitransparent concave mirror 123.

In the present embodiment, the radius of curvature and the arrangement position of each of the semitransparent concave mirror 123 and the shading member SV3 may be determined to correspond to a part of each of two concentric spheres having different radii, both of the concentric spheres having centers at the eye of the observer. In the arrangement, the second light L2 proceeding from the outside toward the eye of the observer is always perpendicularly incident on the shading member SV3 and the semitransparent concave mirror 123 because the eye of the observer is at the center of the respective concentric spheres. Thus, reflection at each boundary surface therebetween may be reduced and the deterioration of image quality due to the double reflection may be reduced.

Figure 6:
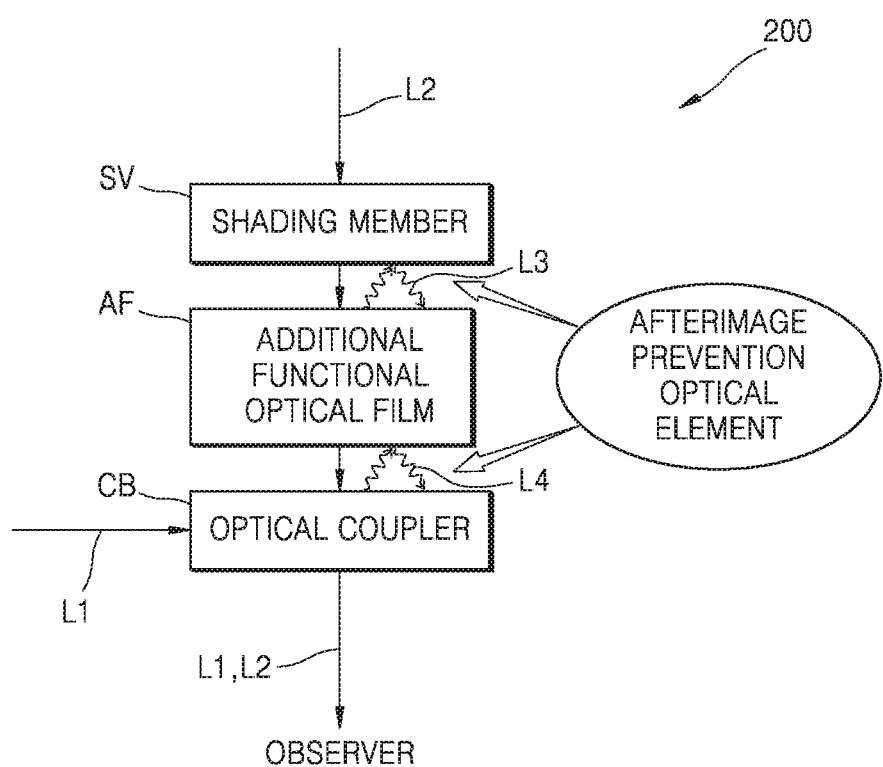
FIG. 6 is a conceptual diagram showing a schematic configuration of a see-through type display device according to an embodiment.
Figure 7A:
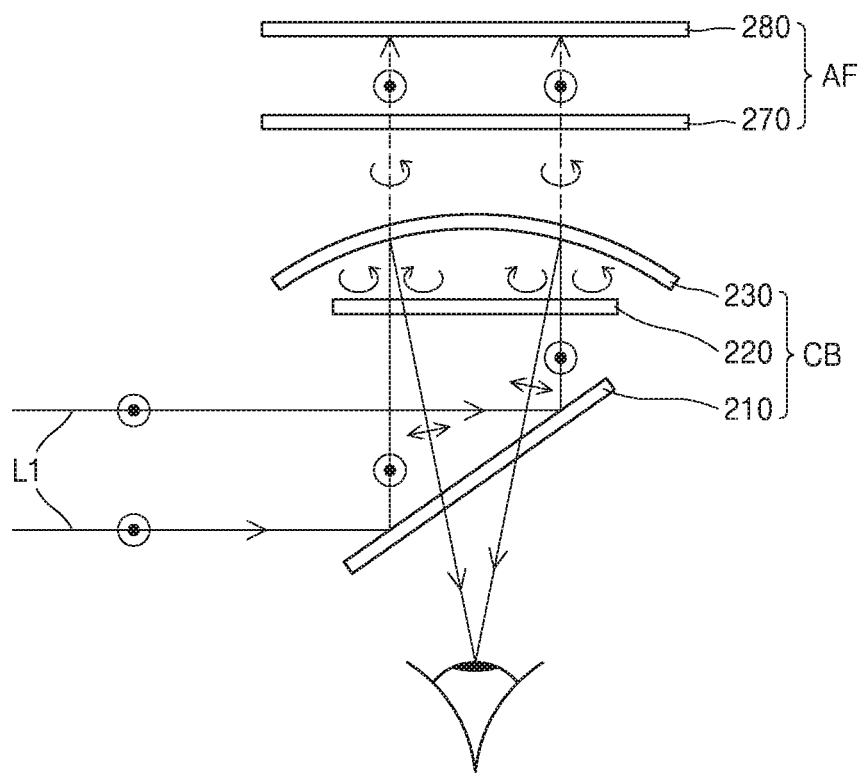
FIGS. 7A and 7B are diagrams showing an exemplary detailed configuration of an optical coupler and an additional functional optical film provided in the see-through type display device of FIG. 6, and an optical path thereby.
Figure 7B:
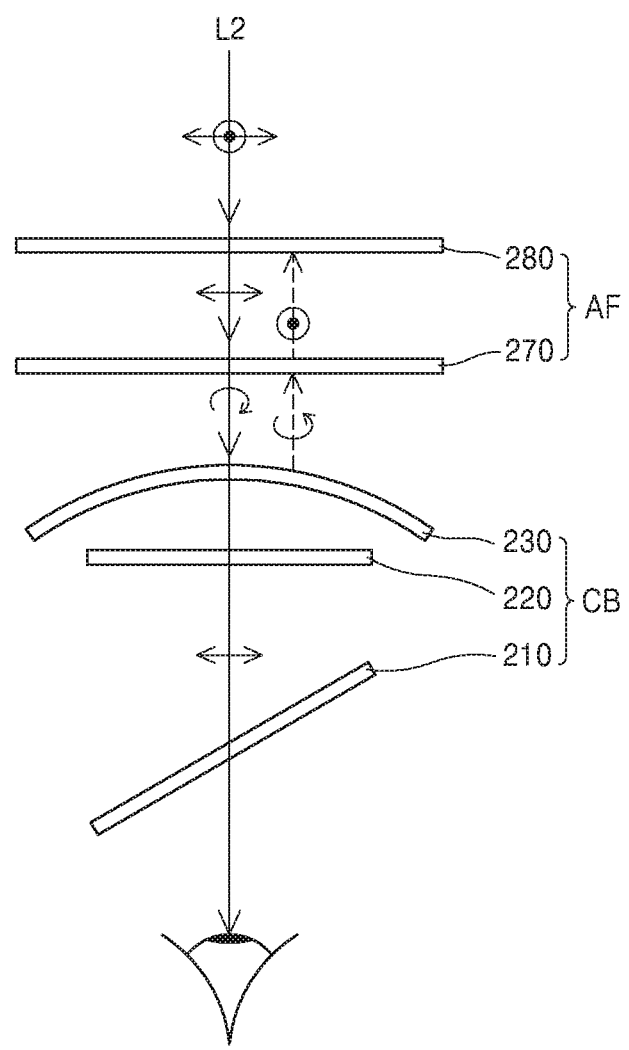

FIG. 6 is a conceptual diagram showing a schematic configuration of a see-through type display device 200 according to another embodiment. FIGS. 7A and 7B are diagrams showing an exemplary detailed configuration of an optical coupler and an additional functional optical film provided in the see-through type display device 200 of FIG. 6, and an optical path thereby.

The see-through type display device 200 may include the optical coupler CB for coupling the first light L1 input in the first direction and the second light L2 input in the second direction and transferring coupled light to the observer, and the shading member SV disposed in front of the optical coupler CB and transferring the second light L2 to the optical coupler CB by reducing the light amount of the second light L2, and an additional functional optical film AF arranged between the optical coupler CB and the shading member SV.

The additional functional optical film AF is provided for functions such as image quality improvement, which may include light leakage prevention. The additional functional optical film AF may include any one of a quarter wave plate (QWP), a half wave plate (HWP), and a linear polarizer, and a combination for implementing a necessary additional function may be selected according to specific characteristics of optical members constituting the optical coupler CB.

For example, as illustrated in FIGS. 7A and 7B, the optical coupler CB may include a polarization beam splitter 210, a quarter wave plate 220, and a semitransparent concave mirror 230, and the additional functional optical film AF may include a quarter wave plate 270 and a linear polarizer 280. The linear polarizer 280 may characteristically transmit light of a second polarization (↔) and absorb light of a first polarization (⊙) that is perpendicular to the second polarization.

The above configuration of the optical coupler CB is provided to enhance optical efficiency, and the additional functional optical film AF is provided to prevent a light leakage phenomenon occurring as the first light L1 leaks to the outside. Such an optical path is described below.

The polarization beam splitter 210 splits incident light into two directions by reflecting the light of the first polarization (⊙) of the incident light and transmitting the light of the second polarization (↔). The first polarization (⊙) and the second polarization (↔) are linear polarizations perpendicular to each other. Contrary to the see-through type display devices 101, 102, and 103 of the above-described embodiments, in which a half mirror is used as the beam splitter 110 to transmit half of the incident light and reflect the other half of the incident light, the polarization beam splitter 210 splits light by utilizing polarization. Accordingly, when the first light L1 provided from the image forming optical system DS is incident on the optical coupler CB in a state of the first polarization (⊙), light loss is hardly generated in the polarization beam splitter 210. When the first light L1 reflected by the polarization beam splitter 210 passes through the quarter wave plate 220, the polarization state of the first light L1 is changed from the first polarization (⊙) to left-handed circular polarization, and then the first light L1 is incident on the semitransparent concave mirror 230. Next, the first light L1 is reflected by the semitransparent concave mirror 230, and the left-handed circular polarization is changed to a right-handed circular polarization by the reflection. In the drawing, the left-handed circular polarization is indicated by a counterclockwise arrow, and the right-handed circular polarization is indicated by a clockwise arrow. The first light L1 that is reflected passes through the quarter wave plate 220 again, and then the right-handed circular polarization is changed to the second polarization (↔) and the first light L1 is again incident on the polarization beam splitter 210. Since the polarization beam splitter 210 transmits the light of the second polarization (↔), the first light L1 of the second polarization (↔) may be transmitted to and focused at the eye of the observer.

When the first light L1 is reflected by the semitransparent concave mirror 230, part of the first light L1 is transmitted through the semitransparent concave mirror 230. The additional functional optical film AF prevents the light from leaking to the outside. An optical path of the first light L1 transmitted through the semitransparent concave mirror 230 is indicated by a dashed line. The light transmitted through the semitransparent concave mirror 230 is in a left-handed circular polarization state, and the polarization of the light after passing through the quarter wave plate 270 is changed to the first polarization (⊙). Since the linear polarizer 280 characteristically transmits the light of the second polarization (↔) and absorbs light of other polarization, the first light L1 in the first polarization (⊙) state is not transmitted through the linear polarizer 280, thereby being prevented from leaking to the outside. Accordingly, no light leakage of the first light L1 may be recognized from the outside by the observer.

Referring to FIG. 7B, the second light L2 from the outside may be transmitted through the additional functional optical film AF and the optical coupler CB to reach the eye of the observer. The second light L2 that is external light is light generally including a mix of the first polarization (⊙) and the second polarization (↔). The second light L2 passes through the linear polarizer 280 that transmits only the light of the second polarization (↔) and has a second polarization (↔) state. Next, the second light L2 has a right-handed circular polarization while passing through the quarter wave plate 270. Next, the second light L2 is transmitted through the semitransparent concave mirror 230 and passes through the quarter wave plate 220 to be incident in the second polarization (↔) state on the polarization beam splitter 210. Since the polarization beam splitter 210 transmits the light of the second polarization (↔), the second light L2 of the second polarization (↔) is transmitted through the polarization beam splitter 210 and reaches the eye of the observer. Furthermore, the additional functional optical film AF prevents the second light L2 that is reflected by the semitransparent concave mirror 230 from leaking to the outside again. For example, as indicated by a dashed line, when part of the second light L2 is reflected by the semitransparent concave mirror 230, the second light L2 has a left-handed circular polarization. Next, when the second light L2 passes through the quarter wave plate 270, the polarization of the second light L2 is changed to the first polarization (⊙), and thus, the second light L2 may not pass through the linear polarizer 280. In other words, the additional functional optical film AF may prevent the second light L2 reflected from the semitransparent concave mirror 230 from being seen by an outside observer.

According to the optical coupler CB and the additional functional optical film AF configured as above, the optical efficiency of the first light L1 containing information generated by the display device reaching the eye of the observer may be enhanced, and the light leakage of the first light L1 to the outside may be prevented. Furthermore, the second light L2 that is external light may reach the eye of the observer efficiently, and further the re-reflection of part of the second light L2 back toward the outside may be prevented.

However, as the additional functional optical film AF is provided, the optical path on which double reflection to multi-reflection may occur is diversified and a probability that image quality deteriorates may increase.

The see-through type display device 200 according to the present embodiment may include optical elements for preventing light L4 that is multi-reflected between the optical coupler CB and the additional functional optical film AF and light L3 that is multi-reflected between the additional functional optical film AF and the shading member SV from reaching the eye of the observer. Accordingly, the reason for deterioration of image quality may be reduced, and thus a high quality image may be recognized by the observer.

Figure 8:
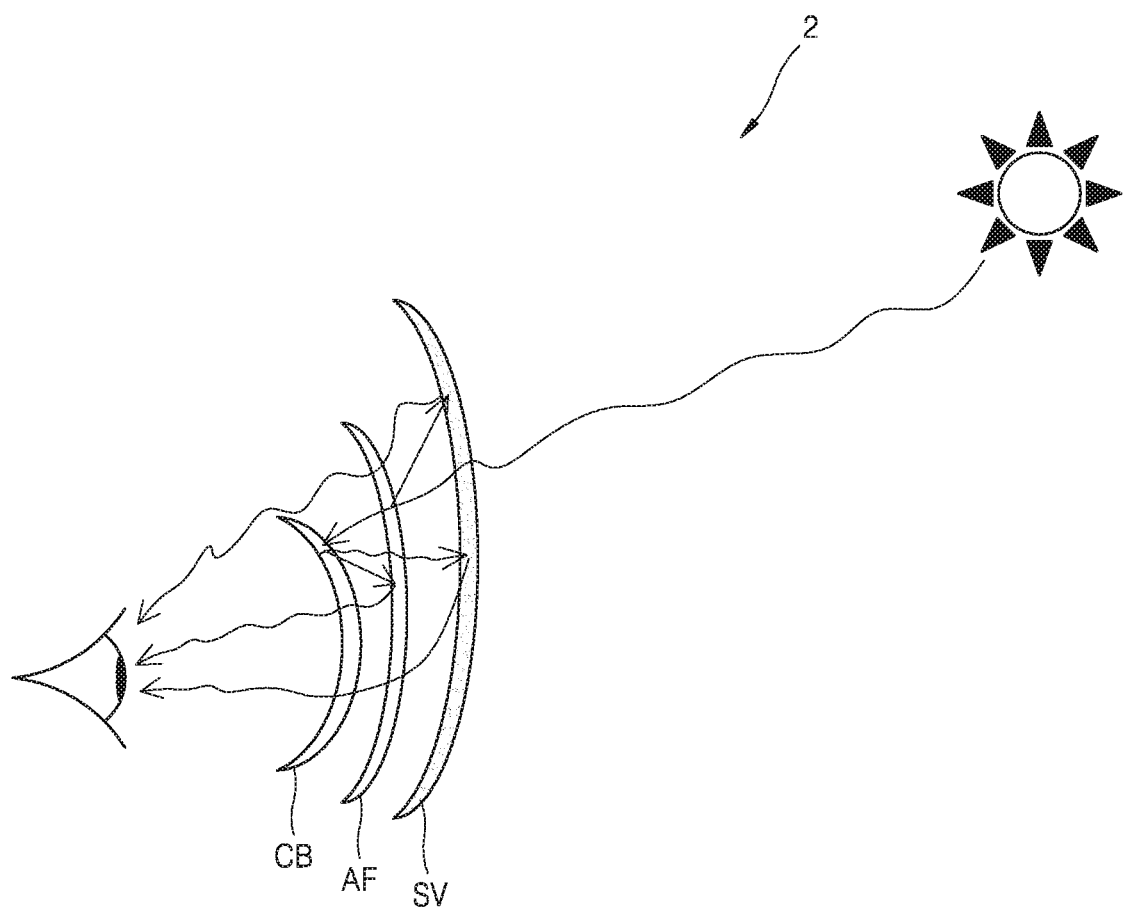
FIG. 8 is a conceptual diagram showing an optical path on which an afterimage is formed due to ambient light in a see-through type display device according to a comparative example.

FIG. 8 is a conceptual diagram showing an optical path on which an afterimage is formed due to ambient light in a see-through type display device 2 according to another comparative example.

The see-through type display device 2 according to the present comparative example may include the optical coupler CB, the additional functional optical film AF, and the shading member SV, but does not include the afterimage prevention optical element as shown in the embodiment. Part of the light transmitted through the shading member SV may be reflected by one surface of the additional functional optical film AF, and the reflected light may be reflected again by the shading member SV. Furthermore, part of the light transmitted through the additional functional optical film AF may be reflected by the surface of the optical coupler CB and then reflected by one surface of the additional functional optical film AF, or may pass through the additional functional optical film AF and then may be reflected again by a surface of the shading member SV. As such, when the light that is multi-reflected via various paths is recognized by the observer, source light is reimaged, and thus image quality may deteriorate.

Although FIG. 8 illustrates an example of the optical path on which the light of the external light source is reimaged, similar deterioration of image quality due to multi-reflection may occur with light input from a different direction, for example, image light formed by the display device that is transferred to the observer via the optical coupler CB.

Figure 9:
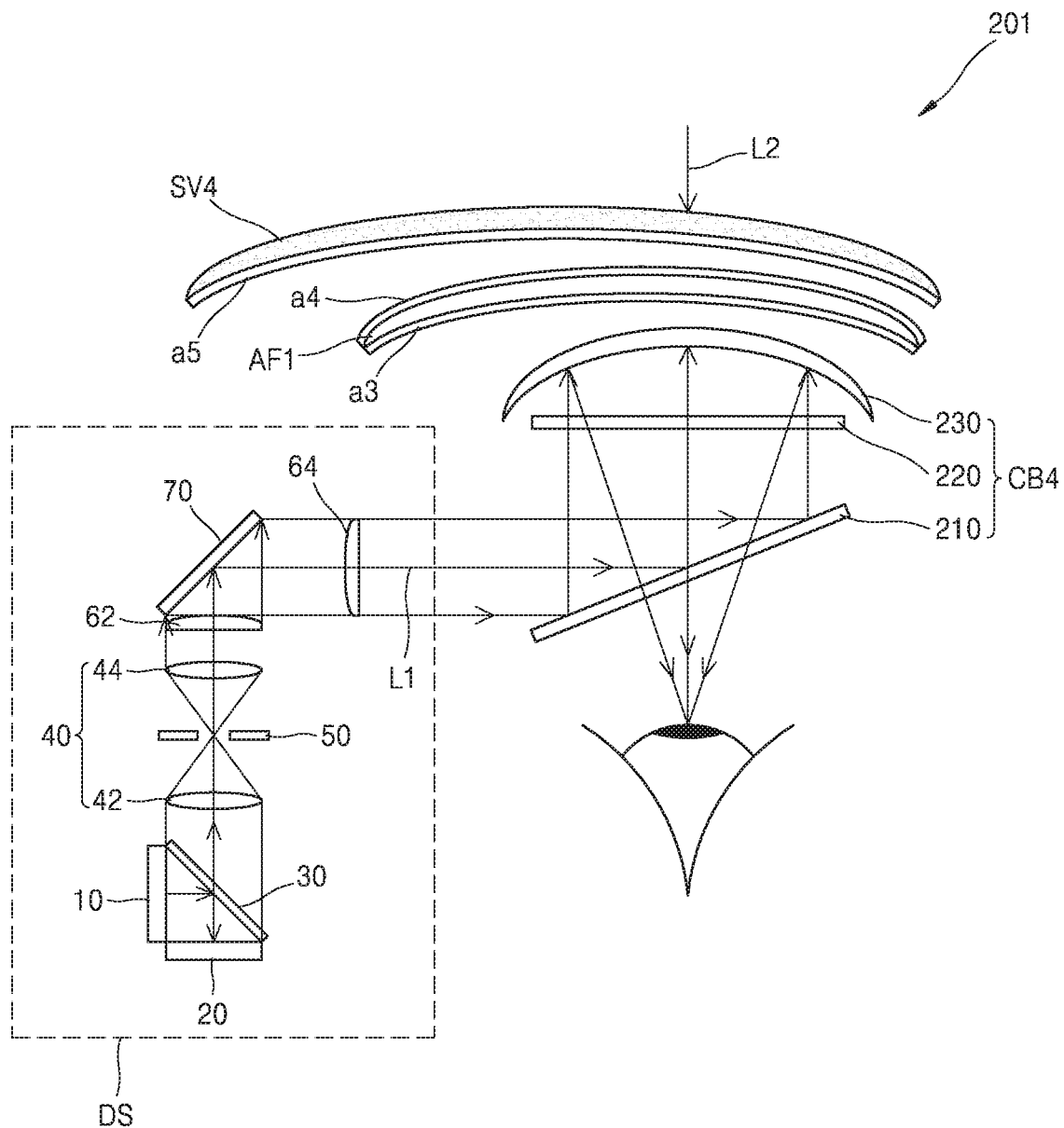
FIG. 9 illustrates a schematic optical arrangement of a see-through type display device according to an embodiment.

FIG. 9 illustrates a schematic optical arrangement of a see-through type display device 201 according to another embodiment.

The see-through type display device 201 according to the present embodiment may include an optical coupler CB4 for coupling the first light L1 input in the first direction and the second light L2 input in the second direction and transferring coupled light to the observer, and a shading member SV4 disposed in front of the optical coupler CB4 and transferring the second light L2 to the optical coupler CB4 by reducing the light amount of the second light L2. An additional functional optical film AF1 is arranged between the optical coupler CB4 and the shading member SV4. The see-through type display device 201 may also include the image forming optical system DS for forming an image to allow the first light L1 to include image information.

The optical coupler CB4 may include the polarization beam splitter 210, the quarter wave plate 220, and the semitransparent concave mirror 230. The polarization beam splitter 210, as described in FIGS. 7A and 7B, may reflect light of a first polarization and transmit light of a second polarization.

The additional functional optical film AF1 may include the quarter wave plate and the linear polarizer as described in FIGS. 7A and 7B. In the following drawings, for convenience of explanation, only an appearance of the additional functional optical film AF1 will be illustrated.

The see-through type display device 201 of the present embodiment may include an antireflection layer formed on at least two surfaces from among: the two outermost surfaces of the additional functional optical film AF1, a surface of the shading member SV4 facing the additional functional optical film AF1, and a surface of the semitransparent concave mirror 230 facing the additional functional optical film AF1. The antireflection layer may be formed by alternately depositing two types of materials having different refractive indexes to a certain thickness, and have a configuration which causes destructive interference of reflected light formed at a plurality of boundary surfaces.

For example, as described above, antireflection layers a3 and a4 may be respectively formed on the two outermost surfaces of the additional functional optical film AF1, and an antireflection layer a5 may be formed on an inner surface of the shading member SV4, that is, the surface of the shading member SV4 facing the additional functional optical film AF1. However, the above-mentioned positions are exemplary, and the positions of the antireflection layers may be variously changed as long as multi-reflection occurring between the shading member SV4, the additional functional optical film AF1, and the optical coupler CB4 is reduced.

The first light L1 provided from the image forming optical system DS changes a path thereof at the polarization beam splitter 210 and reaches the semitransparent concave mirror 230 via the quarter wave plate 220. Then, the first light L1 is reflected by the semitransparent concave mirror 230 and focused at the position of the observer. In this state, even when part of the first light L1 is transmitted through the semitransparent concave mirror 230 and reflected by the additional functional optical film AF1 instead of being reflected by the semitransparent concave mirror 230, reflection of the first light L1 by the additional functional optical film AF1 is reduced by the antireflection layer a3 formed on the one surface of the additional functional optical film AF1. Furthermore, when part of the light is transmitted through the additional functional optical film AF1 and reflected by the shading member SV4, reflection of the first light L1 by the shading member SV4 is reduced by the antireflection layer a5 formed on one surface of the shading member SV4. Furthermore, when part of the light is reflected by the shading member SV4 and then also reflected by the additional functional optical film AF1, reflection of the first light L1 by the additional function optical film AF1 is reduced by the antireflection layer a4 formed on the other surface of the additional functional optical film AF1. Accordingly, the amount of light reflected via a multipath that reaches the eye of the observer is reduced.

The second light L2 sequentially passes the shading member SV4, the additional functional optical film AF1, the semitransparent concave mirror 230, the quarter wave plate 220, and the polarization beam splitter 210 and proceeds toward the eye of the observer. In this state, most of the light that reaches the eye of the observer via a multipath is extinguished by the antireflection layers a3, a4, and a5.

Accordingly, in the see-through type display device 201, when an image combined with the first light L1 and the second light L2 is provided to the observer, the deterioration of image quality may be reduced.

Figure 10:
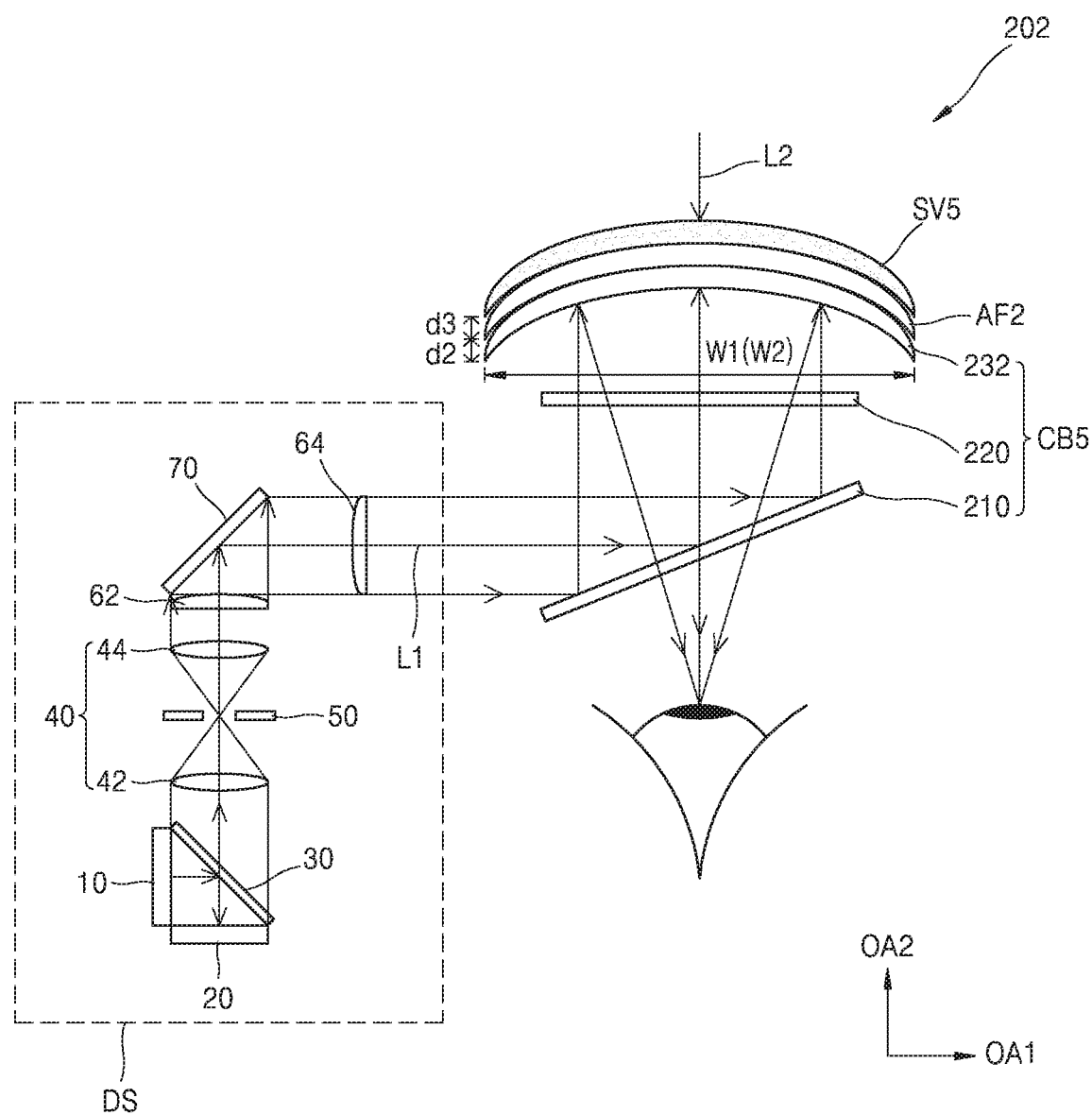
FIG. 10 illustrates a schematic optical arrangement of a see-through type display device according to an embodiment.

FIG. 10 illustrates a schematic optical arrangement of a see-through type display device 202 according to another embodiment.

The see-through type display device 202 according to the present embodiment may include an optical coupler CB5 for coupling the first light L1 input in the first direction and the second light L2 input in the second direction and transferring coupled light to the observer, and a shading member SV5 disposed in front of the optical coupler CB5 and transferring the second light L2 to the optical coupler CB5 by reducing the light amount of the second light L2. An additional functional optical film AF2 is arranged between the optical coupler CB5 and the shading member SV5. The see-through type display device 202 may also include the image forming optical system DS for forming an image to allow the first light L1 to include image information.

The optical coupler CB5 may include the polarization beam splitter 210, the quarter wave plate 220, and a semitransparent concave mirror 232.

In the see-through type display device 202 of the present embodiment, the shading member SV5, the additional functional optical film AF2, and the semitransparent concave mirror 232 may be combined with one another such that their respective surfaces contact one another as shown, e.g., in FIG. 10.

In the above configuration, reflection from a combined surface of the semitransparent concave mirror 232 and the additional functional optical film AF2, and a combined surface of the additional functional optical film AF2 and the shading member SV5, may be reduced. The semitransparent concave mirror 232, the additional functional optical film AF2, and the shading member SV5 may be formed of materials having the same refractive index. In this case, since there is substantially no optical boundary at the combined surfaces, reflection at the combined surfaces may be reduced. Alternatively, any one of the semitransparent concave mirror 232 and the shading member SV5 may be formed of a material having the same refractive index as that of the additional functional optical film AF2.

Two surfaces facing each other of the semitransparent concave mirror 232 and the additional functional optical film AF2, and two surfaces facing each other of the additional functional optical film AF2 and the shading member SV5, may have the same curved surface shape. The curved surface may be a spherical surface or aspherical surface.

Although in the drawing the semitransparent concave mirror 232, the additional functional optical film AF2, and the shading member SV5 are illustrated as being cemented with one another, the illustration is exemplary. The surface of the semitransparent concave mirror 232 that faces the additional functional optical film AF2, the surfaces of the additional functional optical film AF2, and the surface of the shading member SV5 that faces the additional functional optical film AF2 may have radii of curvature that are similar enough to each other so as to reduce double reflection between the surfaces. A difference $\Delta R1$ in the radius of curvature at center portions of the two surfaces facing each other of the semitransparent concave mirror 232 and the additional functional optical film AF2, and a difference $\Delta R2$ in the radius of curvature at center portions of the two surfaces facing each other of the additional functional optical film AF2 and the shading member SV5, may be set to a range in which the deterioration of image quality due to the double reflection is not recognizable to the human eye. As described above in FIG. 4, the difference $\Delta R1$ in the radius of curvature may be expressed by a ratio of a distance d2 between the edges of the semitransparent concave mirror 232 and the additional functional optical film AF2 to the width W1 of the semitransparent concave mirror 232 as shown, e.g., in FIG. 10. Similarly, the difference ΔR2 in the radius of curvature may be expressed by a ratio of a distance d3 between the edges of the additional functional optical film AF2 and the shading member SV5 to a width W2 of the additional functional optical film AF2 in a direction perpendicular to an optical axis OA2 of the additional functional optical film AF2. In the present embodiment, the width W2 of the additional functional optical film AF2 is the same as the width W1 of the semitransparent concave mirror 232.

The difference ΔR1 in the radius of curvature at the center portions of the two surfaces facing each other of the semitransparent concave mirror 232 and the additional functional optical film AF2 may be set to satisfy the following condition.

$$d2/W1<\!\!{}^1\!/_{10}$$

In the above inequality, "d2" denotes a distance between the edges of the semitransparent concave mirror 232 and the additional functional optical film AF2, and "W1" denotes a width of the semitransparent concave mirror 232 in the direction perpendicular to an optical axis OA2 of the semitransparent concave mirror 232.

Furthermore, the difference ΔR2 in the radius of curvature at the center portions of the two surfaces facing each other of the additional functional optical film AF2 and the shading member SV5 may be set to satisfy the following condition.

$$d3/W2<\!\!{}^1\!/_{10}$$

In the above inequality, "d3" denotes a distance between the edges of the additional functional optical film AF2 and the shading member SV5, and "W2" denotes a width of the additional functional optical film AF2 in the direction perpendicular to the optical axis OA2 of the additional functional optical film AF2.

The ΔR1 and the ΔR2 may not be the same value. In other words, "d2/W1" and "d3/W2" may not be the same value.

Figure 11:
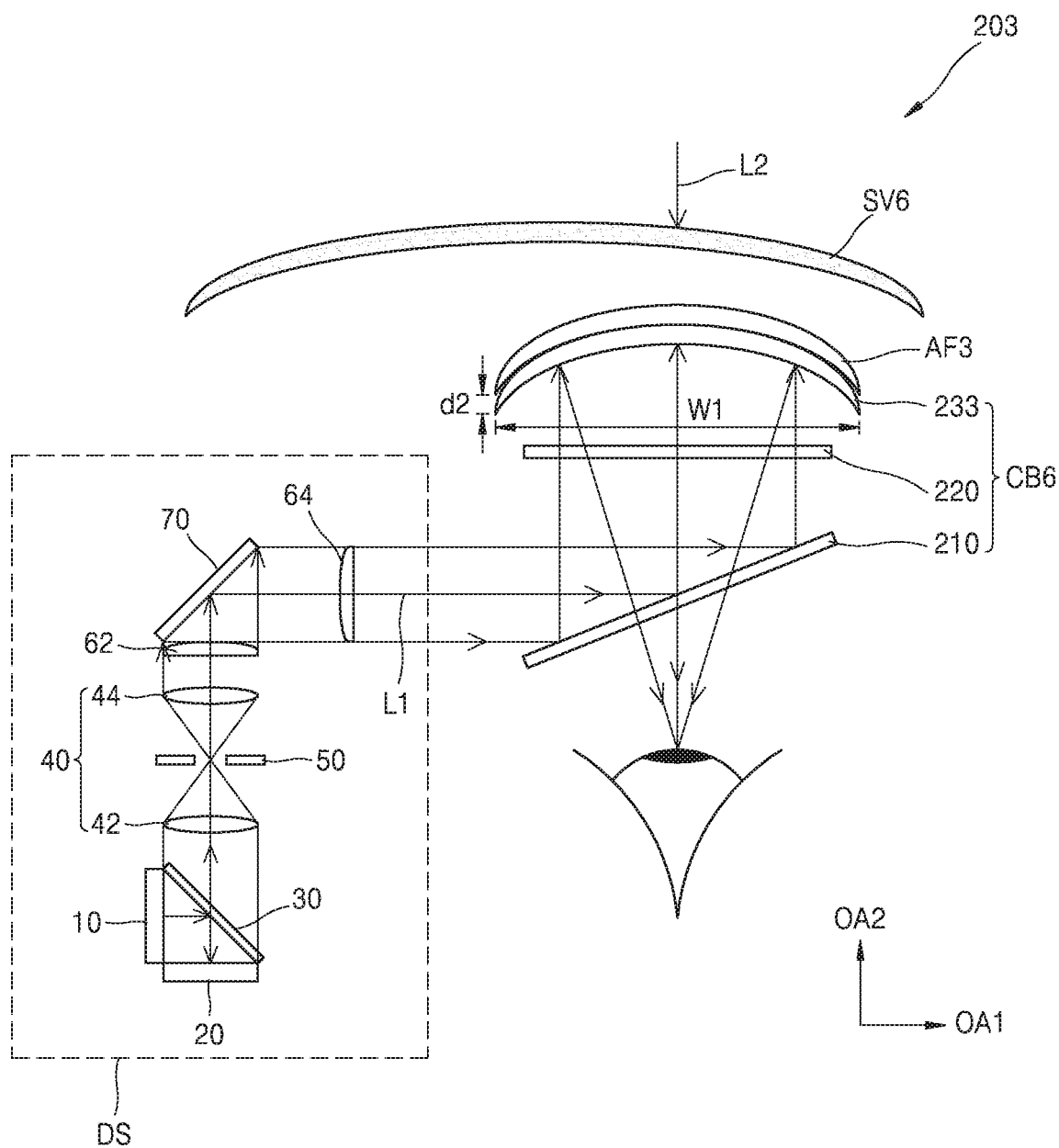
FIG. 11 illustrates a schematic optical arrangement of an image display device according to an embodiment.

FIG. 11 illustrates a schematic optical arrangement of a see-through type display device 203 according to another embodiment.

The see-through type display device 203 according to the present embodiment may include an optical coupler CB6 for coupling the first light L1 input in the first direction and the second light L2 input in the second direction and transferring coupled light to the observer, and a shading member SV6 disposed in front of the optical coupler CB6 and transferring the second light L2 to the optical coupler CB6 by reducing the light amount of the second light L2. An additional functional optical film AF3 is arranged between the optical coupler CB6 and the shading member SV6. The see-through type display device 203 may also include the image forming optical system DS for forming an image to allow the first light L1 to include image information.

The optical coupler CB6 may include the polarization beam splitter 210, the quarter wave plate 220, and a semitransparent concave mirror 233.

The see-through type display device 203 of the present embodiment is different from the see-through type display device 202 of FIG. 10 in that only the additional functional optical film AF3 and the semitransparent concave mirror 233 are combined with each other. In other words, the shading member SV6 is not combined with the additional functional optical film AF3.

Two surfaces facing each other of the additional functional optical film AF3 and the semitransparent concave mirror 233 may have the same curved surface shape. Furthermore, as described above, a difference in the radius of curvature at center portions of the two surfaces facing each other of the semitransparent concave mirror 233 and the additional functional optical film AF3 may be set to satisfy the following condition.

$$d2/W1<\!\!{}^1\!/_{10}$$

In the above inequality, "d2" denotes a distance between the edges of the semitransparent concave mirror 233 and the additional functional optical film AF3, and "W1" denotes a width of the semitransparent concave mirror 233 in the direction perpendicular to the optical axis OA2 of the semitransparent concave mirror 233.

Figure 12:
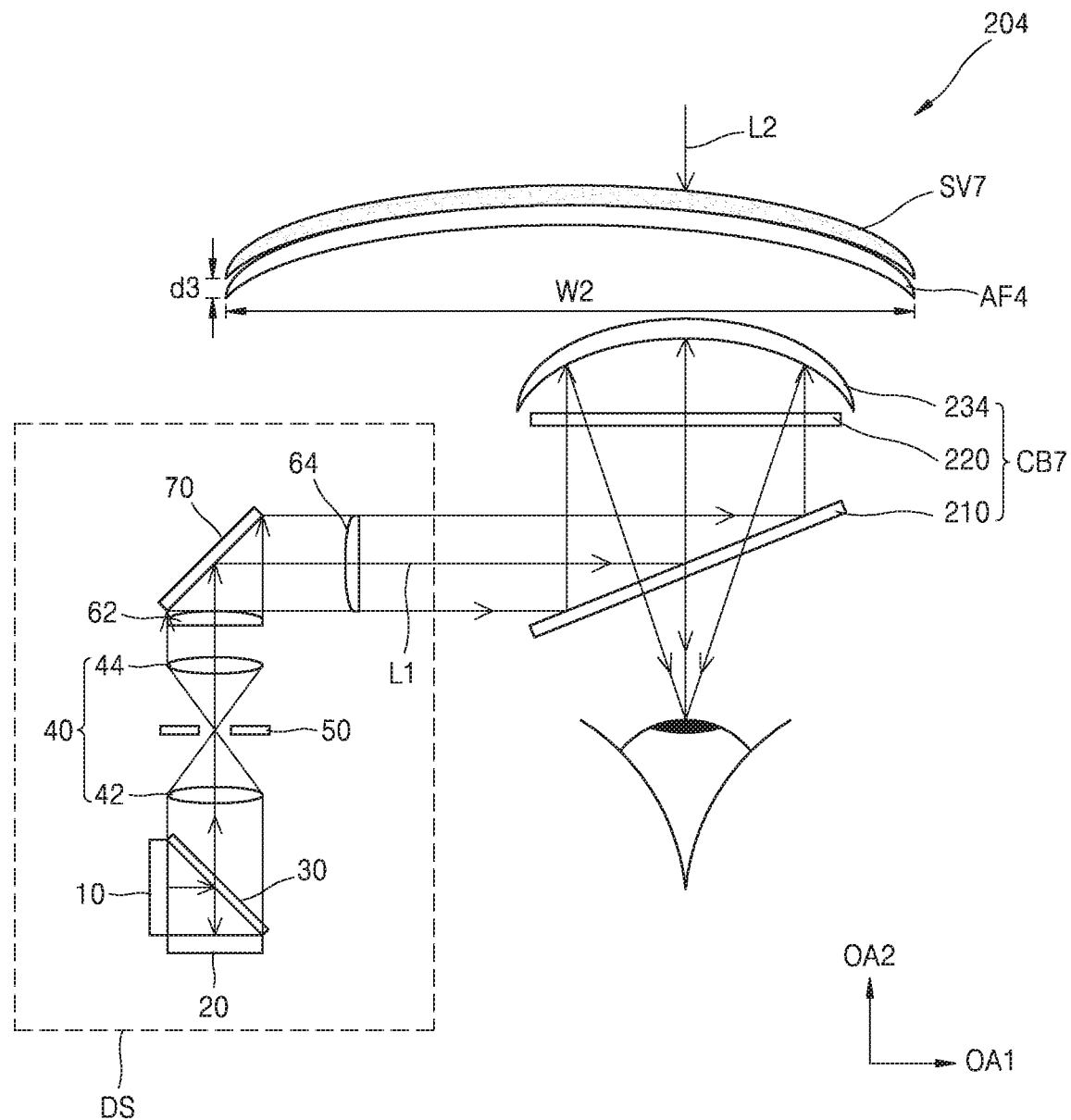
FIG. 12 illustrates a schematic optical arrangement of a see-through type display device according to an embodiment.

FIG. 12 illustrates a schematic optical arrangement of a see-through type display device 204 according to another embodiment.

The see-through type display device 204 according to the present embodiment may include an optical coupler CB7 for coupling the first light L1 input in the first direction and the second light L2 input in the second direction and transferring coupled light to the observer, and a shading member SV7 disposed in front of the optical coupler CB7 and transferring the second light L2 to the optical coupler CB7 by reducing the light amount of the second light L2. An additional functional optical film AF4 is arranged between the optical coupler CB7 and the shading member SV7. The see-through type display device 204 may also include the image forming optical system DS for forming an image to allow the first light L1 to include image information.

The optical coupler CB7 may include the polarization beam splitter 210, the quarter wave plate 220, and a semitransparent concave mirror 234.

The see-through type display device 204 of the present embodiment is different from the see-through type display device 202 of FIG. 10 and the see-through type display device 203 of FIG. 11 in that only the additional functional optical film AF4 and the shading member SV7 are combined with each other. In other words, the semitransparent concave mirror 234 is not combined with the additional functional optical film AF4.

Two surfaces facing each other of the additional functional optical film AF4 and the shading member SV7 may have the same curved surface shape. Furthermore, as described above, a difference in the radius of curvature at center portions of the two surfaces facing each other of the additional functional optical film AF4 and the shading member SV7 may be set to satisfy the following condition.

$$d3/W2<\!\!{}^1\!/_{10}$$

In the above inequality, "d3" denotes a distance between the edges of the additional functional optical film AF4 and the shading member SV7, and "W2" denotes a width of the additional functional optical film AF4 in the direction perpendicular to the optical axis OA2 of the additional functional optical film AF4.

Figure 13:
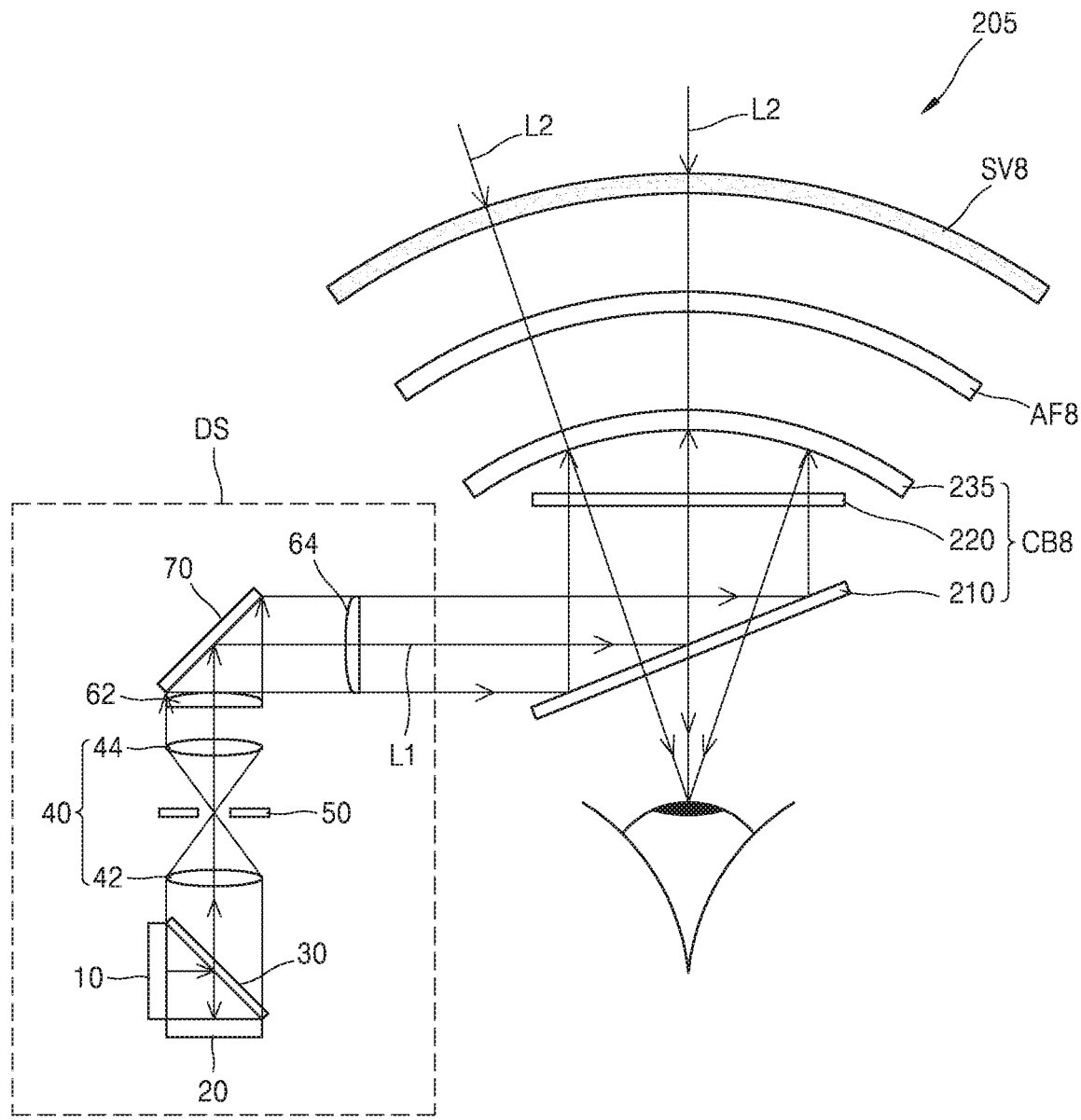
FIG. 13 illustrates a schematic optical arrangement of a see-through type display device according to an embodiment.

FIG. 13 illustrates a schematic optical arrangement of a see-through type display device 205 according to another embodiment.

The see-through type display device 205 may include an optical coupler CB8 for coupling the first light L1 input in the first direction and the second light L2 input in the second direction and transferring coupled light to the observer, and a shading member SV8 disposed in front of the optical coupler CB8 and transferring the second light L2 to the optical coupler CB8 by reducing the light amount of the second light L2. An additional functional optical film AF8 is arranged between the optical coupler CB8 and the shading member SV8. The see-through type display device 205 may also include the image forming optical system DS for forming an image to allow the first light L1 to include image information.

The optical coupler CB8 may include the polarization beam splitter 210, the quarter wave plate 220, and a semi-transparent concave mirror 235.

In the present embodiment, the radius of curvature and the arrangement position of each of the shading member SV8, the additional functional optical film AF8, and the semi-transparent concave mirror 235 may be determined to correspond to a part of each of three concentric spheres having different radii, all three of the concentric spheres having centers at the eye of the observer.

In the arrangement, the second light L2 proceeding from the outside toward the eye of the observer is always perpendicularly incident on the shading member SV8, the additional functional optical film AF8, and the semitransparent concave mirror 235 because the eye of the observer is at the center of the respective concentric spheres. Thus, reflection at each boundary surface therebetween may be reduced, and the deterioration of image quality due to the multi-reflection may be reduced.

The above-described see-through type display devices 100, 101, 102, 103, 200, 201, 202, 203, 204, and 205 may be configured in a wearable form. All or some of the constituent elements of the see-through type display devices 100, 101, 102, 103, 200, 201, 202, 203, 204, and 205 may be provided in the form of a wearable device.

For example, the above-described see-through type display devices 100, 101, 102, 103, 200, 201, 202, 203, 204, and 205 may be provided in the form of a head mounted display (HMD). Furthermore, the present disclosure is not limited thereto, and the above-described see-through type display devices 100, 101, 102, 103, 200, 201, 202, 203, 204, and 205 may be provided in the form of a glasses-type display or a goggle-type display.

The above-described see-through type display devices 100, 101, 102, 103, 200, 201, 202, 203, 204, and 205 may provide the image formed by the image forming optical system DS and an image of the real world altogether to the observer. As such, when a real environment image is displayed together, the above-described see-through type display devices 100, 101, 102, 103, 200, 201, 202, 203, 204, and 205 may be used to implement augmented reality (AR). AR, which provides virtual objects or information about the real world environment by combing the same, may further enhance the experience of reality. For example, at the position of the observer, additional information about an environment provided by the real world may be formed by the image forming optical system DS and provided to the observer. An AR display may be applied to a ubiquitous environment or an Internet of things (IoT) environment.

A real world image may not be limited to a real environment, and for example, may be an image formed by other imaging devices. Accordingly, the above-described see-through type display devices 100, 101, 102, 103, 200, 201, 202, 203, 204, and 205 may be used as multi-image display devices that show two types of images together.

The above-described see-through type display devices 100, 101, 102, 103, 200, 201, 202, 203, 204, and 205 may be operated by being engaged with or connected to other electronic devices such as smart phones. For example, a smart phone may be provided with a processor for driving each of the above-described see-through type display devices 100, 101, 102, 103, 200, 201, 202, 203, 204, and 205.

As described above, since the above-described see-through type display device is provided with optical elements which may reduce light multi-reflected between optical parts from reaching the observer, image quality may be improved.

The above-described see-through type display device may be applied to a wearable device, and further to a wearable type AR display device, thereby providing a high quality image to the observer.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A see-through display device comprising:
an optical coupler that couples first light input from a first direction and second light input from a second direction that is different from the first direction, the optical coupler transferring coupled light including the first light and the second light to an observer; and
a shading member disposed in front of the optical coupler, the shading member transmitting a part of the second light to the optical coupler by reducing a light amount of the second light,
wherein at least one of the optical coupler and the shading member is configured to limit a reflection phenomenon occurring between the optical coupler and the shading member, and
wherein the shading member comprises a transparent material,
wherein the optical coupler comprises a semitransparent concave mirror,
wherein a center portion of a surface of the semitransparent concave mirror contacts a center portion of a surface of the shading member.

2. The see-through display device of claim 1, further comprising an image forming optical system that forms an image,
wherein the first light includes the image.

3. The see-through display device of claim 1, wherein the shading member is configured to limit the reflection phenomenon occurring between the optical coupler and the shading member.

4. The see-through display device of claim 3, wherein an antireflection layer is formed on at least one of a surface of the shading member and a surface of the semitransparent concave mirror that faces the surface of the shading member.

5. The see-through display device of claim 1, wherein the optical coupler further comprises a beam splitter that reflects the first light toward the semitransparent concave mirror and transmits light input from the semitransparent concave mirror.

6. The see-through display device of claim 5, wherein the beam splitter comprises a half mirror arranged inclined to an optical axis of the first light.

7. The see-through display device of claim 1, wherein a surface of the semitransparent concave mirror has a same curved surface shape as a surface of the shading member that faces the surface of the semitransparent concave mirror.

8. The see-through display device of claim 1, wherein a difference in radii of curvature of a center portion of a surface of the semitransparent concave mirror and a center portion of a surface of the shading member that faces the surface of the semitransparent concave mirror is set to satisfy a following condition:

$$d1/W1 < 1/10$$

where "d1" is a distance in a direction parallel to an optical axis of the semitransparent concave mirror between an edge of the semitransparent concave mirror and a corresponding edge of the shading member, and "W1" is a width of the semitransparent concave mirror in a direction perpendicular to the optical axis of the semitransparent concave mirror.

9. The see-through display device of claim 1, wherein the semitransparent concave mirror is formed in a shape of a first spherical sector of a first sphere centered at an eye of the observer, and wherein the shading member is formed in a shape of a second spherical sector of a second sphere centered at the eye of the observer, the second sphere having a second radius different from a first radius of the first sphere.

10. The see-through display device of claim 1, wherein the optical coupler further comprises:

a polarization beam splitter that reflects a portion of the first light having a first polarization toward the semitransparent concave mirror and transmits light having a second polarization input from the semitransparent concave mirror; and a first quarter wave plate arranged between the polarization beam splitter and the semitransparent concave mirror.

11. The see-through display device of claim 10, wherein an additional functional optical film that prevents light leakage of the first light is further arranged between the optical coupler and the shading member.

12. The see-through display device of claim 11, wherein the additional functional optical film comprises a second quarter wave plate and a linear polarizer.

13. The see-through display device of claim 11, wherein an antireflection layer is formed on at least two surfaces from among a first surface of the additional functional optical film, a second surface of the additional functional optical film, a surface of the shading member facing the additional functional optical film, and a surface of the semitransparent concave mirror facing the additional functional optical film.

14. The see-through display device of claim 11, wherein a surface of the shading member contacts a first surface of the additional functional optical film, and a surface of the semitransparent concave mirror contacts a second surface of the additional functional optical film.

15. The see-through display device of claim 11, wherein a surface of the additional functional optical film contacts a surface of the semitransparent concave mirror.

16. The see-through display device of claim 11, wherein a surface of the additional functional optical film has a same curved surface shape as a surface of the semitransparent concave mirror.

17. The see-through display device of claim 11, wherein a difference in radii of curvature of a center portion of a surface of the additional functional optical film and a center portion of a surface of the semitransparent concave mirror that faces the surface of the additional functional optical film is set to satisfy a following condition:

$$d2/W1 < 1/10$$

where "d2" is a distance in a direction parallel to an optical axis of the semitransparent concave mirror between an edge of the additional functional optical film and a corresponding edge of the semitransparent concave mirror, and "W1" is a width of the semitransparent concave mirror in a direction perpendicular to the optical axis of the semitransparent concave mirror.

18. The see-through display device of claim 11, wherein a surface of the shading member contacts a surface of the additional functional optical film.

19. The see-through display device of claim 11, wherein a surface of the shading member has a same curved surface shape as a surface of the additional functional optical film.

20. The see-through display device of claim 11, wherein a difference in radii of curvature of a center portion of a surface of the shading member and a center portion of a surface of the additional functional optical film that faces the surface of the shading member is set to satisfy a following condition:

$$d3/W2 < 1/10$$

where "d3" is a distance in a direction parallel to an optical axis of the additional function optical film between an edge of the shading member and a corresponding edge of the additional functional optical film, and "W2" is a width of the additional functional optical film in a direction perpendicular to the optical axis of the additional functional optical film.

21. The see-through display device of claim 11, wherein the shading member is formed in a shape of a first spherical sector of a first sphere centered at an eye of the observer, wherein the additional functional optical film is formed in a shape of a second spherical sector of a second sphere centered at the eye of the observer, the second sphere having a second radius different from a first radius of the first sphere, and wherein the semitransparent concave mirror is formed in a shape of a third spherical sector of a third sphere centered at the eye of the observer, the third sphere having a third radius different from the first radius and different from the second radius.

22. A wearable device comprising the see-through display device of claim 1.

23. The see-through display device of claim 1, wherein the shading member is formed of a material having a same refractive index as a material of the optical coupler.

24. A display device comprising:

an optical coupler that receives first light corresponding to a first image and traveling on a first optical path and second light corresponding to a second image and traveling on a second optical path different from the first optical path, and that transmits the received first light and second light on a third optical path; and a shading member provided on the first optical path that receives the first light and transmits a reduced amount of the first light to the optical coupler, wherein at least one of the optical coupler and the shading member is configured to limit reflection of the reduced amount of the first light between the shading member and the optical coupler, and wherein the shading member comprises a transparent material, wherein the optical coupler comprises a semitransparent concave mirror, wherein a center portion of a surface of the semitransparent concave mirror contacts a center portion of a surface of the shading member.

25. The display device of claim 24,
wherein an antireflection layer is formed on at least one from among a surface of the optical coupler upon which the first light is incident and a surface of the shading member that transmits the reduced amount of the first light to the surface of the optical coupler.

* * * * *